US007802082B2

(12) United States Patent
Kruse et al.

(10) Patent No.: US 7,802,082 B2
(45) Date of Patent: Sep. 21, 2010

(54) METHODS AND SYSTEMS TO DYNAMICALLY CONFIGURE COMPUTING APPARATUSES

(75) Inventors: Mike Kruse, Tigard, OR (US); Ajay Garg, Portland, OR (US); Joseph Lyman, Sherwood, OR (US)

(73) Assignee: Intel Corporation, Santa Clara, CA (US)

( * ) Notice: Subject to any disclaimer, the term of this patent is extended or adjusted under 35 U.S.C. 154(b) by 798 days.

(21) Appl. No.: 11/513,870

(22) Filed: Aug. 31, 2006

(65) Prior Publication Data

US 2008/0059782 A1   Mar. 6, 2008

(51) Int. Cl.
*G06F 15/177* (2006.01)
*G06F 19/00* (2006.01)
(52) U.S. Cl. ............................ 713/1; 713/100; 700/108; 700/112; 700/117; 717/171
(58) Field of Classification Search ............... 713/1, 713/100; 700/108, 112, 117; 717/171
See application file for complete search history.

(56) References Cited

U.S. PATENT DOCUMENTS

| 5,668,992 | A  | * | 9/1997  | Hammer et al. ............ 713/1 |
| 6,543,047 | B1 | * | 4/2003  | Vrhel et al. ............ 717/121 |
| 6,598,223 | B1 | * | 7/2003  | Vrhel et al. ............ 717/174 |
| 6,934,956 | B1 | * | 8/2005  | Allen ............ 719/327 |
| 7,069,428 | B2 | * | 6/2006  | Miyamoto et al. ............ 713/1 |
| 7,149,884 | B2 | * | 12/2006 | O'Connor et al. ............ 713/1 |
| 2002/0099804 | A1 | * | 7/2002 | O'Connor et al. ......... 709/220 |
| 2005/0203756 | A1 | * | 9/2005 | Pirich et al. ............ 705/1 |
| 2006/0069824 | A1 | * | 3/2006 | Hodder ............ 710/72 |
| 2007/0130454 | A1 | * | 6/2007 | Bentley ............ 713/1 |
| 2007/0226481 | A1 | * | 9/2007 | Duncan ............ 713/2 |
| 2008/0046328 | A1 | * | 2/2008 | Paron et al. ............ 705/26 |
| 2008/0046550 | A1 | * | 2/2008 | Mazur et al. ............ 709/223 |
| 2008/0046569 | A1 | * | 2/2008 | DePue et al. ............ 709/227 |
| 2008/0134043 | A1 | * | 6/2008 | Georgis et al. ............ 715/733 |

OTHER PUBLICATIONS

"Preboot Execution Environment (PXE) Specification", Version 2.1, Intel corporation with special contribution from SYSTEMSOFT, Sep. 20, 1999, pp. 4 & 10-14.
"An Introduction to Intel® Active Management Technology (Intel®AMT)", Intel Corporation, Copyright © 2008, pp. 1-12.

* cited by examiner

*Primary Examiner*—Abdelmoniem Elamin
(74) *Attorney, Agent, or Firm*—Schubert Law Group, PLLC; Garland Charpiot (57) ABSTRACT

Methods and systems to dynamically configure computing apparatuses, such as desktop computers and portable computing devices, are disclosed. Embodiments generally comprise configuration systems that communicate with the computing apparatuses, retrieve hardware and/or software information from the apparatuses, and use the information to configure and/or load software onto the apparatuses. The computing apparatuses being configured may comprise desktop computers, computer workstations, or servers, as well as handheld and/or portable computing devices such as notebook or palm-held computers, cellular telephones, and portable media players. In many embodiments, the configuring systems compare information pertaining to installed hardware and software of the computing device, compare the information to software compatibility databases, select software and other configuration information based upon the comparison, and configure the computing apparatuses with the selected software and other configuration information.

25 Claims, 8 Drawing Sheets

METHODS AND SYSTEMS TO DYNAMICALLY CONFIGURE COMPUTING APPARATUSES

FIELD

The present invention is in the field of computing apparatuses. More particularly, the present invention relates to methods and systems to dynamically configure computing apparatuses.

BACKGROUND

Retail, Internet, and mail order businesses sell thousands of computers, such as desktop and notebook computers, every day. These computing apparatuses are becoming more complex and feature-rich with each passing day. For example, it is not uncommon to find portable computing devices that serve as PDAs, operate as cellular telephones, and have wireless communication capabilities that allow their owners to connect to the Internet to surf and send e-mail. Increasingly these portable computing devices are sold with greater numbers of advanced applications, such as word processors, spreadsheet applications, web browsers, and games.

As computers and other computing apparatuses become more complex and feature rich, their initial configuration processes are becoming more involved and complex as well. Additionally, many manufacturers and system integrators offer arrays of configuration choices for the apparatuses in order to satisfy different needs of different consumers. These arrays of configuration choices further complicate the configuration processes. Several of the large platform integrators that sell computer platforms allow consumers to select different combinations of hardware options and software applications when they order desktop and notebook computers. For example when a consumer places an order for a laptop computer, the consumer may often choose the amount of random access memory (RAM), the amount of cache memory, the size of hard drive, the type of compact disc (CD) and digital versatile disc (DVD) drive, the specific operating system, and different applications. Unfortunately, these different platform configurations have exponentially increasing numbers of options in hardware, firmware, systems software (including device drivers), and applications. Currently platform integrators that offer such "build-to-order" platforms, or computing apparatuses, must maintain a very complex production processes to support the variability of platforms provided to their customers.

With no production-friendly and automated method for discovering what hardware is moving along the production line, integrators are required to introduce a significant human element into their already complex production process when configuring the computing apparatuses for consumers. Presently, people on the assembly line must often manually verify and test hardware and software compatibility for these build-to-order systems in a mixed production environment. Otherwise, integrators must maintain separate and distinct production floors for separate hardware and software configurations without the flexibility to customize platforms in a dynamic manner.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and systems to dynamically configure computing apparatuses, such as desktop computers and portable computing apparatuses, are contemplated. Embodiments generally comprise configuration systems that communicate with the computing apparatuses, retrieve hardware and/or software information from the apparatuses, and use the information to configure and load software onto the apparatuses. The apparatus being configured may comprise a desktop computer, a computer workstation, or a network server, as well as a handheld and/or portable computing device such as a notebook or palm-held computer, or even a cellular telephone or portable media player. In many embodiments, a method of configuring the apparatuses involves comparing apparatus information pertaining to installed hardware devices and comparing the apparatus information to software compatibility databases. In several of these embodiments, the configuration systems may load operating systems onto the computing apparatuses and configure parameters associated with the hardware devices, such as firmware settings.

The method embodiments described herein may perform numerous functions when configuring the computing apparatuses. Some methods involve assembling the computing apparatuses and verifying that the assembled apparatuses operate properly. For example, systems integrators may install system boards, components, and various other types of hardware devices in the computing apparatuses. Some method embodiments may connect peripheral devices to the computing apparatuses and install versions of software programs on the apparatuses that are compatible with the peripheral devices. In various embodiments, the configuration system may retrieve different types of information from computing apparatuses, such as serial numbers, hardware addresses, asset tag numbers, model numbers, and firmware version numbers.

In other embodiments, various machine-accessible mediums may contain instructions for operating a configuration system. The instructions generally cause the configuration systems to receive apparatus information from a computing apparatus, select configuration elements based upon the apparatus information, and configure the computing apparatus with the configuration information. The instructions may guide the operations of the configuration systems so that the systems compare information received from the apparatuses, such as hardware version numbers or levels with databases containing configuration elements that are compatible with the information. The instructions may also cause the configuration systems to load images of software programs, such as operating systems and word processing applications, onto the computing apparatuses.

While portions of the following detailed discussion describe embodiments for configuring desktop and notebook computer systems, persons of ordinary skill in the art will recognize that alternative embodiments may involve numerous types of computing systems, such as servers, workstation computers, and portable hand-held computing apparatuses, including portable media players and cellular telephones. Additionally, while some portions of the discussion describe both setting hardware configuration parameters and installing software programs, some embodiments may perform one without the other. For example, some embodiments may only set firmware parameters while other embodiments may only install software programs without altering firmware parameters or settings.

Figure 1A:
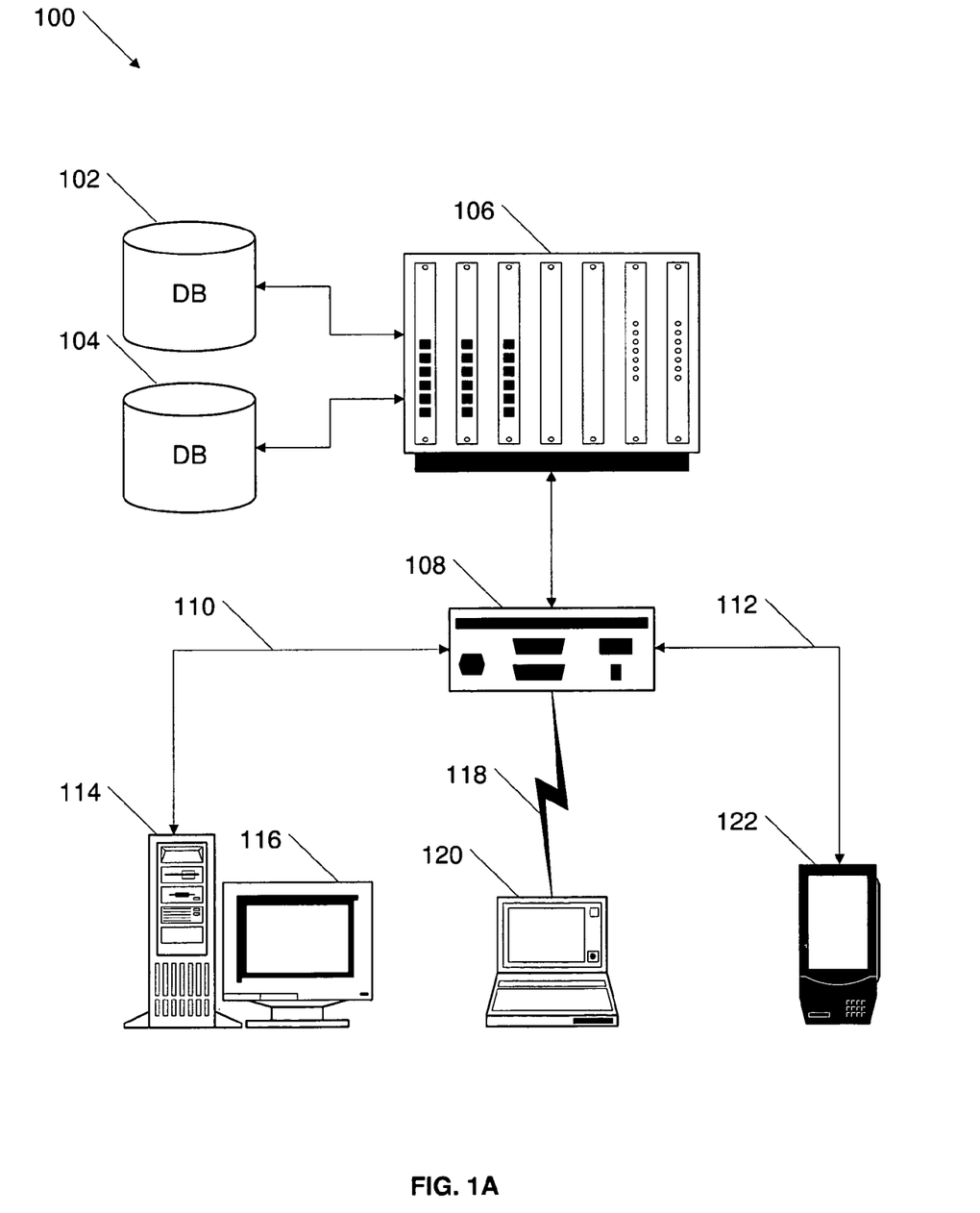
FIG. 1A depicts a system for configuring electronic apparatuses.

Turning now to the drawings, FIG. 1A depicts a configuration system 100 that may be used to configure several types of computing apparatuses. As depicted in FIG. 1A, configuration system 100 has a configuration apparatus 106 coupled to a communication module 108. In different embodiments configuration apparatus 106 comprise a variety of different devices. For example, one embodiment configuration apparatus 106 may comprise a single configuration server computer, while another embodiment may comprise two or more configuration servers working in conjunction with each other, each server performing a separate function during a configuration. In the case of multiple servers, the servers may reside in the same rack or they may reside in different racks and located in separate locations. In further embodiments, configuration apparatus 106 may comprise a personal computer, such as a desktop or a laptop PC. In many embodiments, configuration apparatus 106 may operate using volatile memory, such as dynamic random access memory (DRAM).

Communication module 108 may take on a variety of different forms in different embodiments. In some embodiments communication module 108 may comprise one or more external networking devices, such as a network router, hub, or switch, while in other embodiments it may comprise an internal networking card located in configuration apparatus 106. Communication module 108 may communicate with a variety of computing apparatuses. As shown in FIG. 1A, communication module 108 may use communication link 110 to communicate with a desktop tower PC 114 having a monitor 116. Communication module 108 may use communication link 118 to communicate with a notebook computer 120 and use communication link 112 communicate with a PDA 122.

The communication links between communication module 108 and the computing apparatuses, as well as between communication module 108 and configuration apparatus 106, may vary in different embodiments. For example, communication link 110 may comprise a networking cable connected to both communication module 108 and desktop tower PC 114 or, alternatively, comprise a wireless communication link between communication module 108 and notebook computer 120. Communication link 112 between communication module 108 and PDA 122 may comprise a universal serial bus (USB) cable, a FireWire® cable, or an infrared communication link.

In addition to the various types of hardware and forms of communication links between communication module 108 and the computing apparatus being configured, the method of the communication, such as a communication protocol, may also vary from embodiment to embodiment. For example in some embodiments communication link 110 may utilize an application layer protocol such as File Transfer Protocol (FTP) or Hypertext Transfer Protocol (HTTP) as well as a session and transport layer protocol, such as Transmission Control Protocol (TCP). Additionally, the communication protocol may conform to an open standard or to some proprietary standard.

Each of the computing apparatuses being configured in configuration system 100 may have numerous hardware configurations. For example, desktop tower PC 114 may comprise a bare-bones system with a motherboard, hard drive, and a cathode ray tube (CRT) display for monitor 116. Alternatively, desktop tower PC 114 may comprise a loaded system with a motherboard, a hard drive, a DVD dual layer writable drive, a high-performance graphics card, and high-resolution liquid crystal display (LCD) for monitor 116. Similarly, notebook computer 120 and PDA 122 may have numerous hardware configurations as well. Notebook computer 120 may have numerous LCD display screens having different display resolutions to choose from, numerous display chipsets for each of the display screens, a variety of different processors, several different memory configurations, and a plethora of different hardware peripherals such as sound cards, optical storage devices, and data-input devices. PDA 122 may have numerous LCD touch-screen display models from which to choose, numerous hard drive or flash memory size configurations, and available optional features such as USB ports and wireless communication modules.

Aside from the different types of hardware that each of the individual computing apparatuses may contain, each of them may also be configured with various types of software programs. The software programs may comprise basic input/output system (BIOS) algorithms, operating systems, device drivers, and applications, as examples. A manufacturer or systems integrator may need to configure different computing apparatuses differently. For example, a systems integrator may receive one order from a consumer, or a customer, requesting a desktop tower PC having a dual-core processor, 2 gigabytes (GB) of RAM, a 500 GB storage device, a PS/2-style keyboard port, a high-performance graphics adapter, with a UNIX® operating system and a computer-aided design (CAD) application. The systems integrator may receive another order from a different consumer requesting a desktop tower PC having a single-core processor, 1 GB of RAM, a 200 GB storage device, a USB keyboard port, a standard graphics adapter, with Windows® XP and a word processing program installed. In other words, the systems integrator may need to assemble two different hardware configurations of desktop tower PC 114 and install two different configurations of software for each instance of desktop tower PC 114 before deploying or shipping the two configured systems to the customers.

Configuration apparatus 106 may need to perform a series of tasks when configuring the computing apparatuses. Configuration apparatus 106 may install low level software such as BIOS and other algorithms in nonvolatile memory. Configuration apparatus 106 may need to install device drivers for installed hardware. Since each configuration of desktop tower PC 114 may have different types of hardware installed, configuration apparatus 106 may need to install different device drivers that are associated with the installed hardware of each configuration. Continuing with the example above, configuration apparatus 106 may need to install one set a device drivers for the high-performance graphics adapter of the first desktop tower PC 114 and install a second set of device drivers for the standard graphics adapter for the second desktop tower PC 114. Aside from device driver compatibility, configuration apparatus 106 may also need to install different versions of software programs that will work with, or are associated with, installed hardware. Again, continuing with the example above, configuration apparatus 106 may need to install a special version 10.23 of the CAD program instead of a standard version 10.20 that configuration apparatus 106 may normally install. Installing special version 10.23 of the CAD program may be necessary, for example, due to a hardware peculiarity with the high-performance graphics adapter chosen.

To ensure that configuration apparatus 106 selects and installs acceptable versions of device drivers and acceptable versions of other software, configuration apparatus 106 may utilize communication module 108 to communicate with the computing apparatus being configured and retrieve its existing hardware configuration information or other apparatus information. Upon retrieving the hardware configuration information, configuration apparatus 106 may compare the information contained in one or more databases in order to select one or more configuration elements, or configuration information, to use in configuring the computing apparatus. The one or more configuration elements may be different versions of the software programs needing to be installed that are compatible with, or have another association with, the installed hardware. In order to select the configuration elements, configuration apparatus 106 may access a first configuration database 102 and a second configuration database 104.

Configuration apparatus 106 may access first configuration database 102 to determine which device drivers are compatible with the installed hardware, based upon the hardware configuration information retrieved from the computing apparatus. Hardware compatibility information contained in database 102 may provide one or more device drivers that are compatible with each of the installed hardware devices. Configuration apparatus 106 may then choose from the acceptable device drivers provided by database 102, select the most recent versions of each of the drivers, retrieve copies of those drivers from database 102, and save them to the computing apparatus being configured. Configuration apparatus 106 may also work with database 102 to select and install a compatible version of the operating system.

Configuration apparatus 106 may access second configuration database 104 to select additional configuration elements for configuring the computing apparatus. Configuration apparatus 106 may use information contained in second configuration database 104 to determine which applications are compatible with the installed hardware devices, based upon the hardware configuration information retrieved from the computing apparatus. Hardware compatibility information contained in second configuration database 104 may provide one or more versions of each application that are compatible with all of the installed hardware items. Configuration apparatus 106 may then determine which versions of applications contained in database 104 are acceptable or compatible, select the most recent version of each application, retrieve copies or images of those or configuration elements or applications from database 104, and write them to the computing apparatus being configured.

First configuration database 102 and second configuration database 104 may be internal or external to configuration apparatus 106. For example, first configuration database 102 and second configuration database 104 may reside on a single or multiple hard drives inside configuration apparatus 106 if configuration apparatus 106 is a desktop PC. Alternatively, first configuration database 102 and second configuration database 104 may reside in multiple storage devices of server or client computers. Stated differently, first configuration database 102 may reside on one remote server while second configuration database 104 resides on a second remote server.

In addition to the different locations in which the configuration databases may reside in different embodiments, the number of databases accessed by configuration apparatus 106 may also vary from embodiment to embodiment. In some embodiments all of the compatibility information and copies of the software may reside in a single database. In other embodiments one database may contain only hardware compatibility information while copies of the software may reside in one or more other databases. In even further embodiments one database may be used for each software application, wherein each database contains both the hardware compatibility information and the various copies of the software application.

The arrangement of configuration system 100 depicted in FIG. 1A may vary in different embodiments. For example, one embodiment may have two or more configuration apparatuses 106. Another embodiment may have two or more communication modules 108. In many embodiments, first configuration database 102 and/or second configuration database 104 may comprise a storage device, such as a hard disk drive, containing software programs and other configuration information.

Additionally, the number of computing apparatuses that configuration system 100 can configure may vary from embodiment to embodiment. Configuration system 100 may only be able to configure various types of desktop tower PC 114. In other embodiments, configuration system 100 may only be able to configure various types of notebook computer 120. In even further embodiments, configuration system 100 may be able to configure various configurations of both desktop tower PC 114 and notebook computer 120.

The embodiment of configuration system 100 shown in FIG. 1A may configure desktop tower PC 114, notebook computer 120, and PDA 122. Configuration system 100 may be able to configure other types of computing apparatuses in other embodiments. For example, configuration system 100 may be able to configure a cellular telephone. Alternatively, configuration system 100 may be able to configure a portable music player. In even further embodiments, configuration system 100 may be used to configure other computing apparatuses. As examples, configuration system 100 may be used to configure digital video cameras, various models of home or automobile stereos, or other types of consumer electronics and consumer appliances.

Figure 1B:
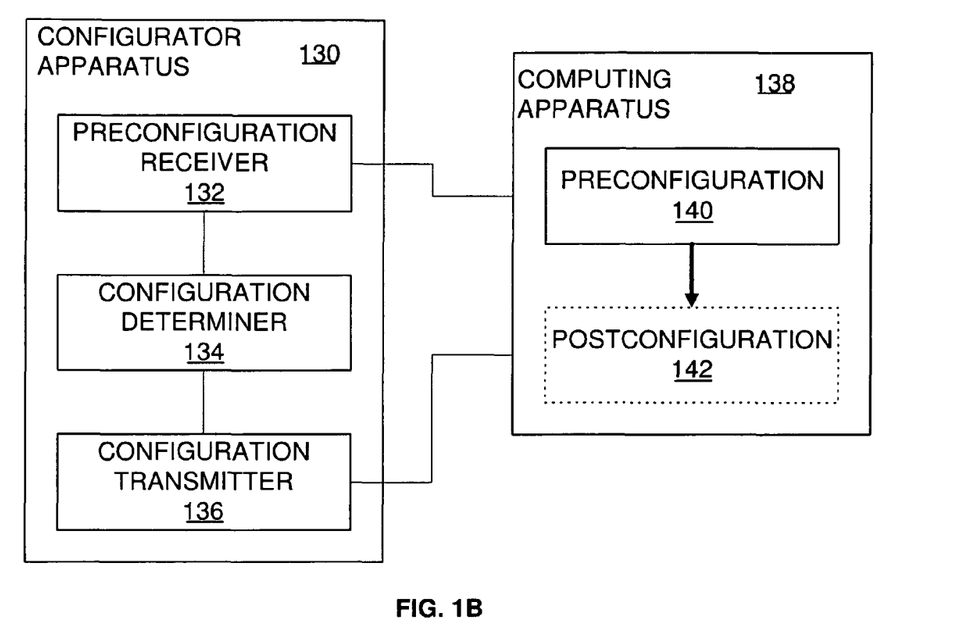
FIG. 1B-1C depict a configurator apparatus and a specific embodiment of a configuration determiner.

An embodiment of a configurator apparatus 130 is depicted in FIG. 1B. Configurator apparatus 130 may comprise an embodiment of a configuration system, such as configuration system 100 in FIG. 1A, used to configure a computing apparatus 138. For example, computing apparatus 138 may comprise, a notebook computer or a PDA such as notebook computer 120 or PDA 122 in FIG. 1A. Configurator apparatus 130 may receive existing configuration information from computing apparatus 138 via preconfiguration receiver 132. In other words, preconfiguration receiver 132 may receive information pertaining to preconfiguration 140. For example, preconfiguration 140 may comprise model numbers, asset tag numbers, hardware version numbers, firmware, and any preexisting installed software of computing apparatus 138.

In response to receiving information of preconfiguration 140, a configuration determiner 134 may select a new arrangement of configuration elements to load onto or store in computing apparatus 138 via configuration transmitter 136.

For example, the new arrangement of configuration elements may comprise hardware settings, firmware settings or programs, device drivers, or software programs. Once configuration transmitter 136 transmits the new arrangement of configuration elements, computing apparatus 138 may have a new configuration, postconfiguration 142, which differs from the earlier configuration, preconfiguration 140.

Figure 1C:
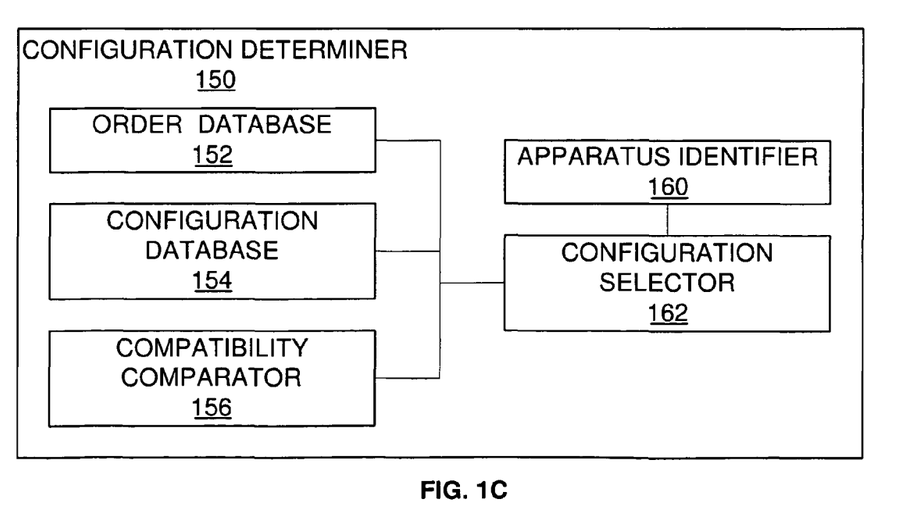

To illustrate a possible sequence of operations performed by configuration determiner 134 in selecting the new arrangement of configuration elements, we may look at a particular embodiment of a configuration determiner 150 shown in FIG. 1C. In other words, configuration determiner 150 may comprise one specific implementation of configuration determiner 134. Upon receiving the information of preconfiguration 140, configuration determiner 150 may identify computing apparatus 138 via apparatus identifier 160 using such information as an asset number. A configuration selector 162 may match the asset number with an order placed by a customer using an order database 152. For example, order database 152 may contain a list of orders placed by customers with hardware asset numbers representing platforms configured to match each of the hardware selections of the customers.

Configuration selector 162 may then select which configuration elements, such as firmware settings and/or particular software programs, need to be implemented on computing apparatus 138 matching the asset number for the order. Additionally, configuration selector 162 may utilize compatibility comparator 156 to determine which versions of the selected configuration elements should be implemented on computing apparatus 138, such as which versions are compatible with the hardware installed in computing apparatus 138. Configuration determiner 150 may then transmit those selected compatible configuration elements to computing apparatus 138 by transmitting them from configuration database 154 via configuration transmitter 136.

Figure 2:
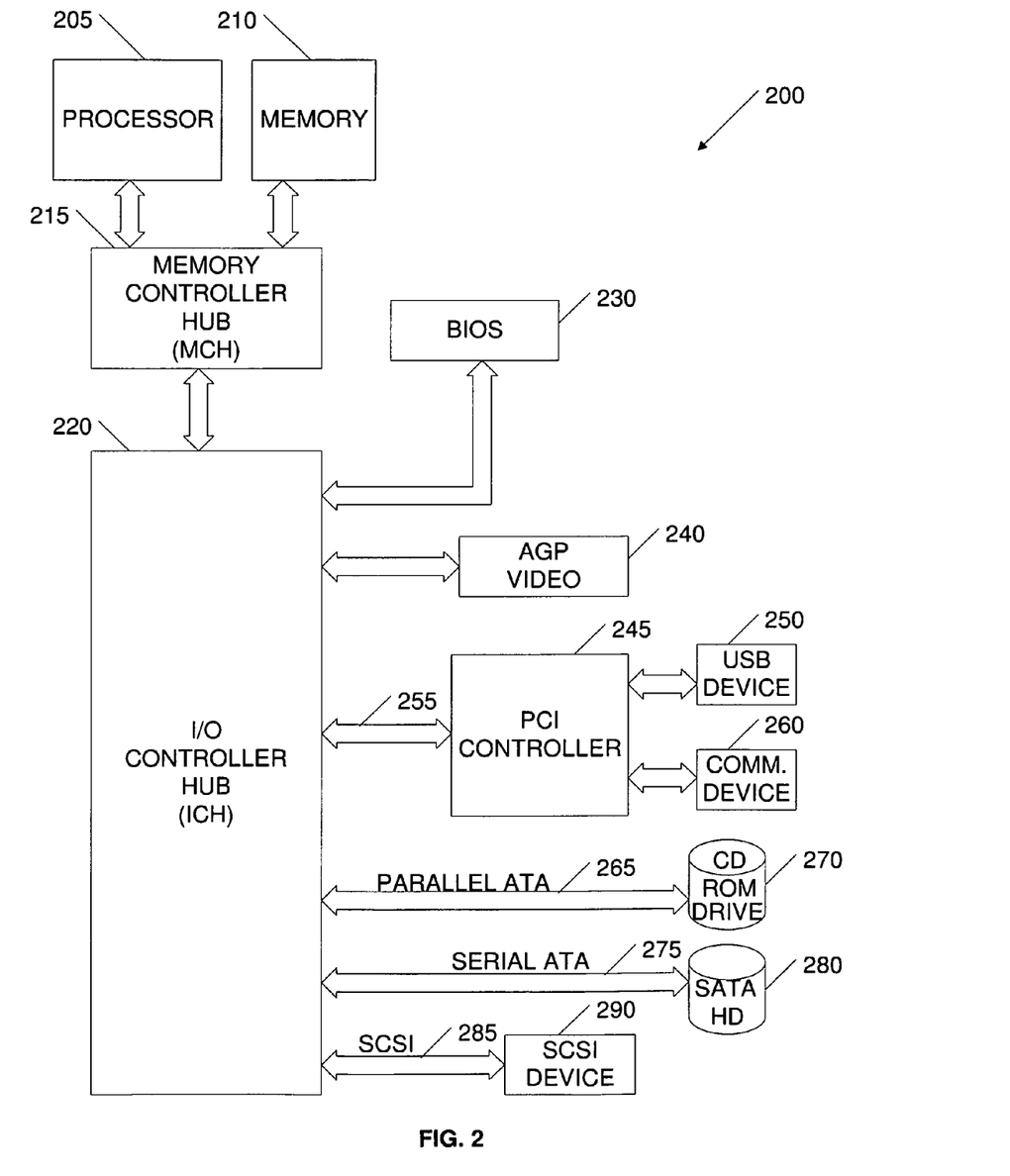
FIG. 2 depicts an embodiment of a computing apparatus capable of being dynamically configured by configuration system.

To illustrate the complexity, as well as the number of different hardware configuration combinations, that a configuration system may encounter and be required to configure for a particular computing apparatus, we turn now to FIG. 2. FIG. 2 shows an embodiment of a computing apparatus 200 which may comprise, as examples, desktop tower PC 114 or notebook computer 120 shown in FIG. 1A.

Computing apparatus 200 may comprise a processor 205. In some embodiments, processor 205 may comprise a single core processor, while in other embodiments processor 205 may comprise a multiple-core processor. Processor 205 may be coupled to a memory controller hub (MCH) 215. Processor 205 may be capable of execute operating instructions, such as instructions of user applications to be installed by a configuration apparatus, in memory 210 by interacting with MCH 215. MCH 215 may also couple processor 205 with an input-output (I/O) controller hub (ICH) 220. ICH 220 may allow processor 205 to interact with external peripheral devices, such as keyboards, scanners, and data storage devices. Such external peripheral devices may be options that a consumer may select when placing an order for computing apparatus 200 from a systems integrator. After an order is placed, a configuration system may have to select numerous configuration elements and use those elements to configure computing apparatus 200, taking into account the type of processor 205, amount of memory 210, and the types of installed peripheral devices.

Once properly configured, computer apparatus 200 may boot, or initialize, during a power-up process using software algorithms, called firmware, stored within read only memory (ROM) on a motherboard of computing apparatus 200. In many embodiments, this firmware may be referred to as a BIOS program 230. Included in the BIOS may be a Power-On-Self-Test (POST) code, or program, which causes processor 205 to perform a number of predefined tests on system hardware. Depending on the hardware that a consumer selects when placing an order, a configuration system may have to program computing apparatus 200 with a version of the BIOS program 230 that is compatible with the selected hardware. For example, a customer may select one of four or five optional processors 205 or specific models of motherboards in which processor 205 is to be installed. The configuration system may have to install a version of the BIOS program 230 into nonvolatile memory of computing apparatus 200 that is compatible with the processor 205 and associated motherboard selected.

In determining the correct software versions to load, a configuration system that configures computing apparatus 200 may communicate with various attached hardware to initialize or reset them and exchange operating information with them. For example, the configuration system may retrieve necessary operating information from a hard drive, such as the model number of serial drive 280, by way of communication device 260. The configuration system may then use such information in determining the proper software to install, such as the proper device drivers.

Computing apparatus 200 may be configured to present information to a user via a display device coupled to Advanced Graphics Port (AGP) video card 240. In some embodiments, the type of display device may be a CRT monitor or a LCD screen or a thin-film transistor flat panel monitor. During the process of configuring computing apparatus 200, the configuration system may retrieve hardware information from AGP video card 240 as well any attached display device. The configuration system may use the information from both AGP video card 240 and the attached display device to determine proper settings and/or software with which to configure computing apparatus 200.

In some embodiments, ICH 220 may need to be configured to allow processor 205 to store and retrieve data from a USB device 250 via a Peripheral Component Interconnect (PCI) controller 245 and PCI bus 255. The configuration system may retrieve hardware information for USB device 250 and/or PCI controller 245 by way of communication device 260 and use such information when selecting the appropriate configuration elements to install to, or use in configuring, computing apparatus 200.

In addition to USB device 250, ICH 220 in computing apparatus 200 may also need to interact with Advanced Technology Attachment (ATA) devices, such as ATA hard drives, CD drives, and DVD drives. For example, ICH 220 may need to operate with a compact disc read only memory (CD ROM) drive 270 via a parallel ATA bus 265. CD ROM drive 270 may vary in different embodiments of computing apparatus 200, such as comprising a compact disc recordable (CD-R) drive, a CD rewritable (CD-RW) drive, a digital versatile disc (DVD) drive, a hard disk drive, a tape drive, or other storage device. Computing apparatus 200 may also have a Serial ATA (SATA) bus 275 which may couple a SATA drive, such as SATA hard drive 280, to ICH 220. SATA hard drive 280 may be used to store the operating system, device drivers, and application software for computing apparatus 200. Computing apparatus 200 may also be configured to operate other types of hardware devices, such as Small Computer Systems Interface (SCSI) device 290 via a SCSI bus 285. In configuring computing apparatus 200, a configuration system may retrieve hardware apparatus information, such as model numbers, hardware versions, and firmware revision numbers for CD ROM drive 270, SATA hard drive 280, and SCSI device 290 in order to determine which versions of device drivers and application software with which to configure computing apparatus 200.

After selecting all of the appropriate configuration elements, such as appropriate versions of software and firmware to install for computing apparatus 200, the configuration system may store the software and firmware in nonvolatile memory and in other storage mediums, via communication device 260, so that the information is not erased when computing apparatus 200 is turned off. The configuration system may store the operating software or configuration information in nonvolatile flash memory or in a programmable read-only memory (PROM) device, either on the motherboard or in individual hardware devices. For example, the configuration system may store the configuration information in nonvolatile memory of SATA hard drive 280. The configuration information stored in SATA hard drive 280 may tell it how to communicate and transfer information with computing apparatus 200.

After using communication module 260 to configure computing apparatus 200 with device drivers and firmware settings, the configuration system may proceed by installing an operating system selected by the consumer when the order was placed. For example, the configuration system may copy an image of a Linux® operating system onto SATA hard drive 280. In other instances, the configuration system may install other operating systems onto SATA hard drive 280, such as Unix®, Macintosh® OS X, or some other operating system.

In addition to installing an operating system, the configuration system may utilize the apparatus information obtained from the individual hardware components, or hardware devices, to select and install the appropriate versions of other configuration elements, such as the applications that the consumer ordered. For example, the configuration system may install a version of a spreadsheet or database application that has been tested and verified compatible with all of the installed hardware. Other types of applications that the configuration system may install are word processors, web browsers, multimedia programs, as well as a variety of other applications. Additionally, while computing apparatus 200 is shown to have numerous peripheral devices attached in the embodiment of FIG. 2, other embodiments may have different combinations of such hardware devices, such as only one or two of the devices. Additionally, computing apparatus 200 may be coupled with other types of hardware not described, such as a sound card, a scanner, a printer, and other types of hardware devices.

Figure 3A:
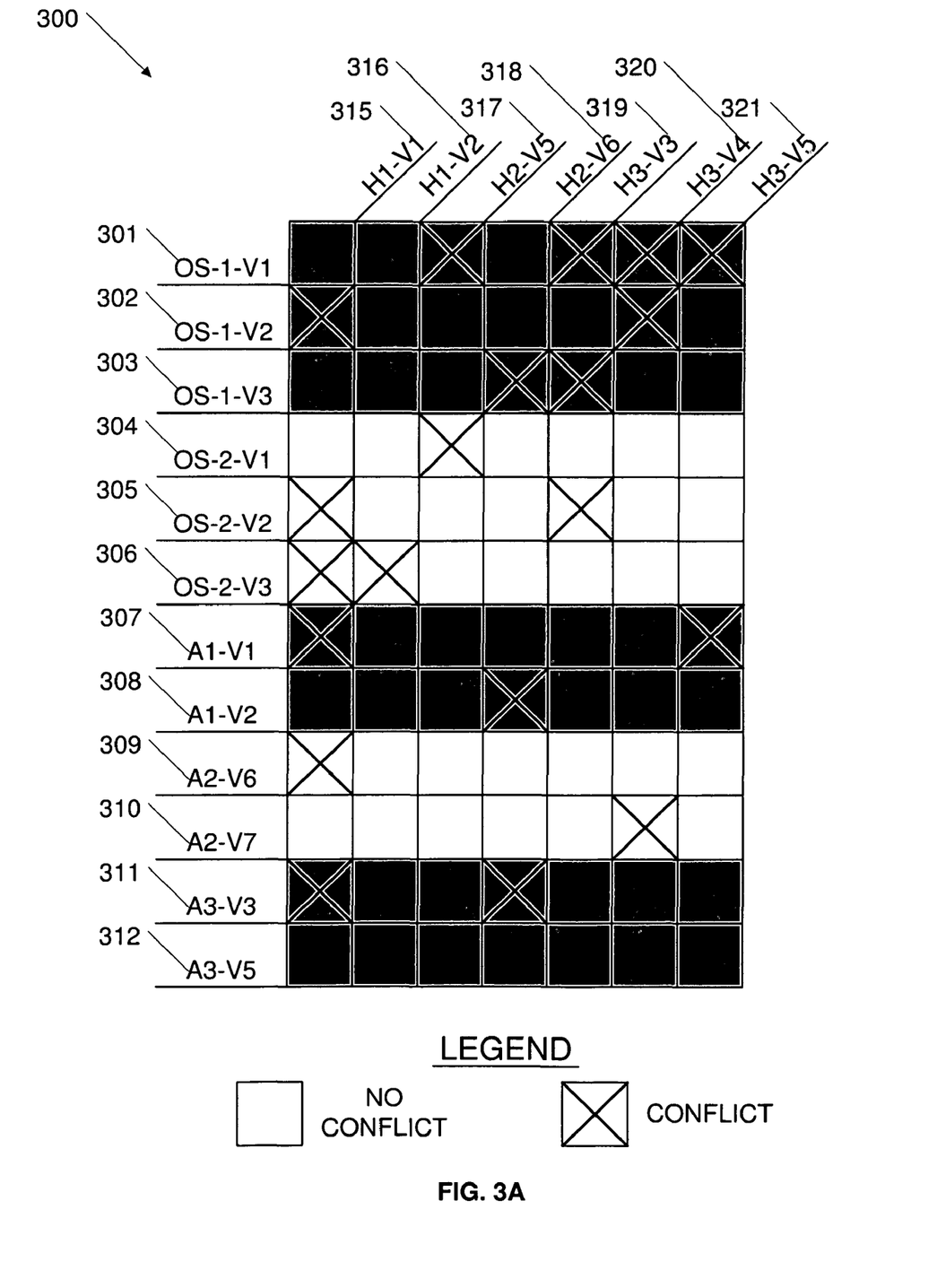
FIG. 3A shows a software and hardware conflict matrix.
Figure 3B:
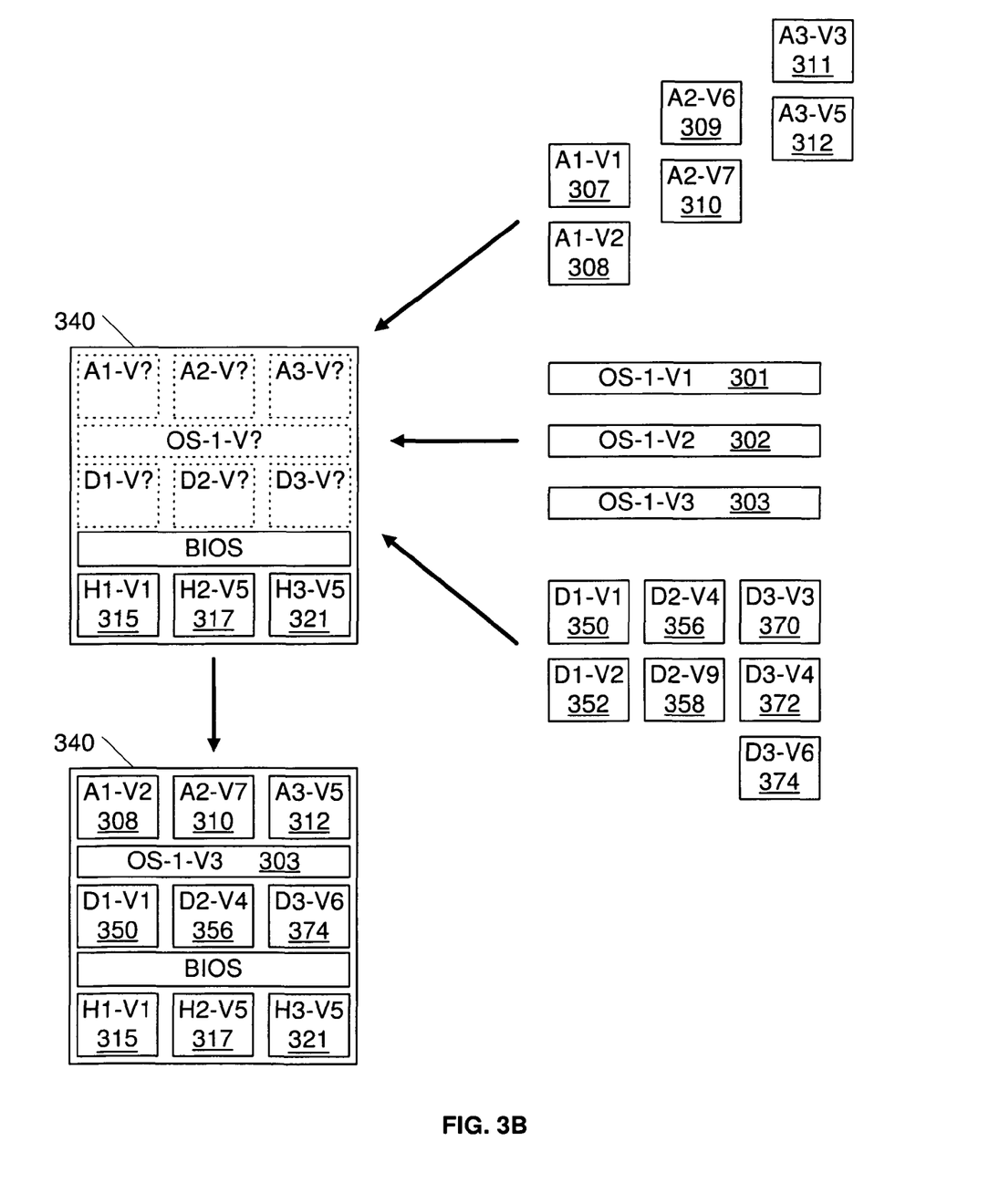
FIG. 3B illustrates how a computing apparatus may be configured with software.

To illustrate why a configuration system may need to select between different configuration elements such as different versions of software and firmware, as well as the how the configuration system may go about selecting such elements, we focus our discussion on FIG. 3A and FIG. 3B. FIG. 3A depicts a software and hardware conflict matrix 300. Along the left side of conflict matrix 300 are several software programs that a configuration system may install on a computing apparatus. Conflict matrix 300 shows that the configuration system may choose from three different versions of a first operating system. Stated more specifically, the configuration system may be able to choose from among a first, a second, and a third version of the first operating system (elements 301, 302, and 303). Conflict matrix 300 also shows that the configuration system may choose from three different versions of a second operating system, such as a first, second, and third version of the second operating system (elements 304, 305, and 306).

The different versions of the first and second operating systems (elements 301 through 306) may represent different revision levels of two different operating systems. For example, the three versions of the first operating system (elements 301 through 303) may represent different revision levels of Windows® XP, such as version 1.0, version 1.2, and version 1.3, respectively. Alternatively, the different versions of the versions of the first operating system (elements 301 through 303) may represent different versions of a Linux® operating system distribution, such as Debian Linux® "Woody", Debian Linux® "Sarge", and Debian Linux® "Sid". Even further, the different versions of the first operating system (elements 301 through 303) may represent the same version of an operating system, as well as the same released version, but with different service packs, such as Windows® Vista™, Windows® Vista™ with Service Pack 1, and Windows® Vista™ with Service Pack 2, respectively.

In addition to selecting different types and versions of operating systems to install, the configuration system may also choose from different versions of several applications. The configuration system may select a first version or a second version of a first application (element 307 or 308). Similarly, the configuration system may choose from a sixth or seventh version of a second application (element 309 or 310), a third or fifth version of a third application (element 311 or 312). The first, second and third applications may represent different types of applications, such as word processors, graphic manipulation programs, games, CAD programs, or multimedia player programs, as examples.

Along the top of conflict matrix 300 are listed different versions of hardware devices for which a configuration system may need to configure and/or install software. In other words, a computing apparatus may contain a first or second version of a first hardware device (elements 315 and 316), a fifth or sixth version of a second hardware device (elements 317 and 318), and a third, fourth and fifth version of a third hardware device (elements 319, 320, and 321). The hardware devices may comprise, for example, circuit board chipsets, peripheral cards, and peripheral components installed in or attached to a computing apparatus. Each version of a particular hardware device may represent the same hardware element with a different version of firmware, different hardware version or revision levels with the same hardware elements, or a combination of both revised firmware and revised hardware elements. Alternatively, each hardware device may represent different models from a particular manufacturer. For example, the first version of the first hardware device (element 315) may represent a standard model of a graphics adapter from one manufacturer, while the second version of the first hardware device (element 316) may represent a high-performance model graphics adapter from the same manufacturer.

As noted in the legend for FIG. 3A, an "X" located at a software-hardware intersection in conflict matrix 300 may represent a combination that the configuration system should avoid. For example, the configuration system need to avoid installing the second version of the first operating system (element 302) whenever the computing apparatus being configured contains or has the first version of the first hardware component (element 315). Alternatively, one may say that whenever the first version of the first hardware component (element 315) is present in a computing apparatus, the configuration system should only install the first or third versions of the first operating system (elements 301 and 303).

The configuration system may also need to avoid installing certain versions of applications due to software-hardware conflicts or lack of support that an application version may have for a particular hardware device. A detailed example may illustrate this more clearly. The sixth version of the second hardware device (element 318) may contain updated firmware which supports advanced features not supported in an earlier version of a particular application. Note that both the third and fifth versions of the third application (elements 311 and 312) support the fifth version of the second hardware device (element 317), but only the fifth application version (element 312) supports the sixth version of the hardware device (element 318). Consequently, for computing apparatuses containing the sixth version of the second hardware device (element 318), the configuration system may only install the fifth version of the third application (element 312).

In conflict matrix 300, only hardware-software conflicts are depicted. However, in different embodiments other types of matrices may be developed and used by the configuration system. In some embodiments, conflict matrix 300 could be modified or changed to identify software-software applications conflicts. For example, conflict matrix 300 may include conflict information for applications that interfere with each other. More specifically, conflict matrix 300 may indicate that version seven of the second application (element 310) is incompatible with the first version of the first application (element 307) or the third version of the second operating system (element 306). Accordingly, the configuration system may need to avoid installing the second application (element 310) whenever the first version of the first application (element 307) or the third version of the second operating system (element 306) are present, and vice-versa. Additionally, in alternative embodiments, conflict matrix 300 may contain other types of compatibility and conflict information. For example, conflict matrix 300 may contain information pertaining to different versions of firmware settings, different BIOS program versions or revisions, hardware manufacture dates, serial numbers, and other types of information that may impact how a configuration system may need to configure a computing apparatus.

One should note that conflict matrix 300 may represent only a pictorial representation of the types of conflicts that a configuration system may need to address when configuring a computing system. Such information may be stored in a variety of different ways. In some embodiments, the conflict information may be stored in a relational database, such as first database 102 shown in FIG. 1A. Alternative embodiments may store the conflict information in a different form, such as in an American Standard Code for Information Interchange (ASCII) file.

FIG. 3B may serve to better illustrate how a configuration system may go about selecting compatible application versions, operating system versions, and hardware device drivers when configuring a computing apparatus. FIG. 3B may illustrate how a computing apparatus 340 may have been assembled with the different versions of the first, second, and third hardware devices (elements 315, 317, and 321) described in FIG. 3A. The configuration system may need to select three device drivers from the group of available device drivers (elements 350, 352, 356, 358, 370, 372, and 374) for each of the hardware devices (elements 315, 317, and 321). The configuration system may also need to select one of the operating system versions (elements 301, 302, 303) as well as copies of the first, second, and third applications (elements 307 through 312) that are compatible with the hardware devices (elements 315, 317, and 321).

The configuration system may first select devices drivers that correspond to each of the installed hardware devices (elements 315, 317, and 321). Note that in FIG. 3B, there are seven device drivers (elements 350, 352, 356, 358, 370, 372, and 374) which correspond to each version of the hardware devices (elements 315, 316, 317, 318, 319, 320, and 321) shown in FIG. 3A. For the first hardware device (element 315), the configuration system may select and install the first version of the first device driver (element 350). Similarly, the configuration system may select the fourth version of the second device driver (element 356) and the sixth version of the third device driver (element 374) for the second and third hardware devices (elements 317, 321), respectively.

The configuration system may proceed by selecting an operating system compatible with the installed hardware devices (elements 315, 317, and 321). By referring to the software and hardware conflict matrix 300, the configuration system may determine that the second version of the first operating system (element 302) conflicts with the first version of the first hardware device (element 315). The configuration system may also determine that the first version of the first operating system (element 301) conflicts with the fifth version of the second hardware device (element 317). However, the configuration system may also determine that the third version of the first operating system (element 303) is compatible with all three versions of the installed hardware devices (elements 315, 317, and 321). Based on this conflict analysis, the configuration system may install the third version of the first operating system (element 303) onto the computing apparatus 340.

In a manner similar to way in which the configuration system determined which operating system version was compatible with each of the installed hardware devices (elements 315, 317, and 321), the configuration system may also select compatible versions of the applications. By again referring to the software and hardware conflict matrix 300, the configuration system may determine that the first version of the first application (element 307) conflicts with two of the installed hardware devices (elements 315 and 321) but the second version of the first application (element 308) has no hardware conflicts. Accordingly, the configuration system may configure the computing apparatus 340 with the second version of the first application (element 308). The configuration system may follow a similar conflict comparison routine to select and install version seven of the second application (element 310) and version five of the third application (element 312). Once configured, the resulting computing apparatus 340 may appear like the bottom version of computing apparatus 340 in FIG. 3B.

Figure 4:
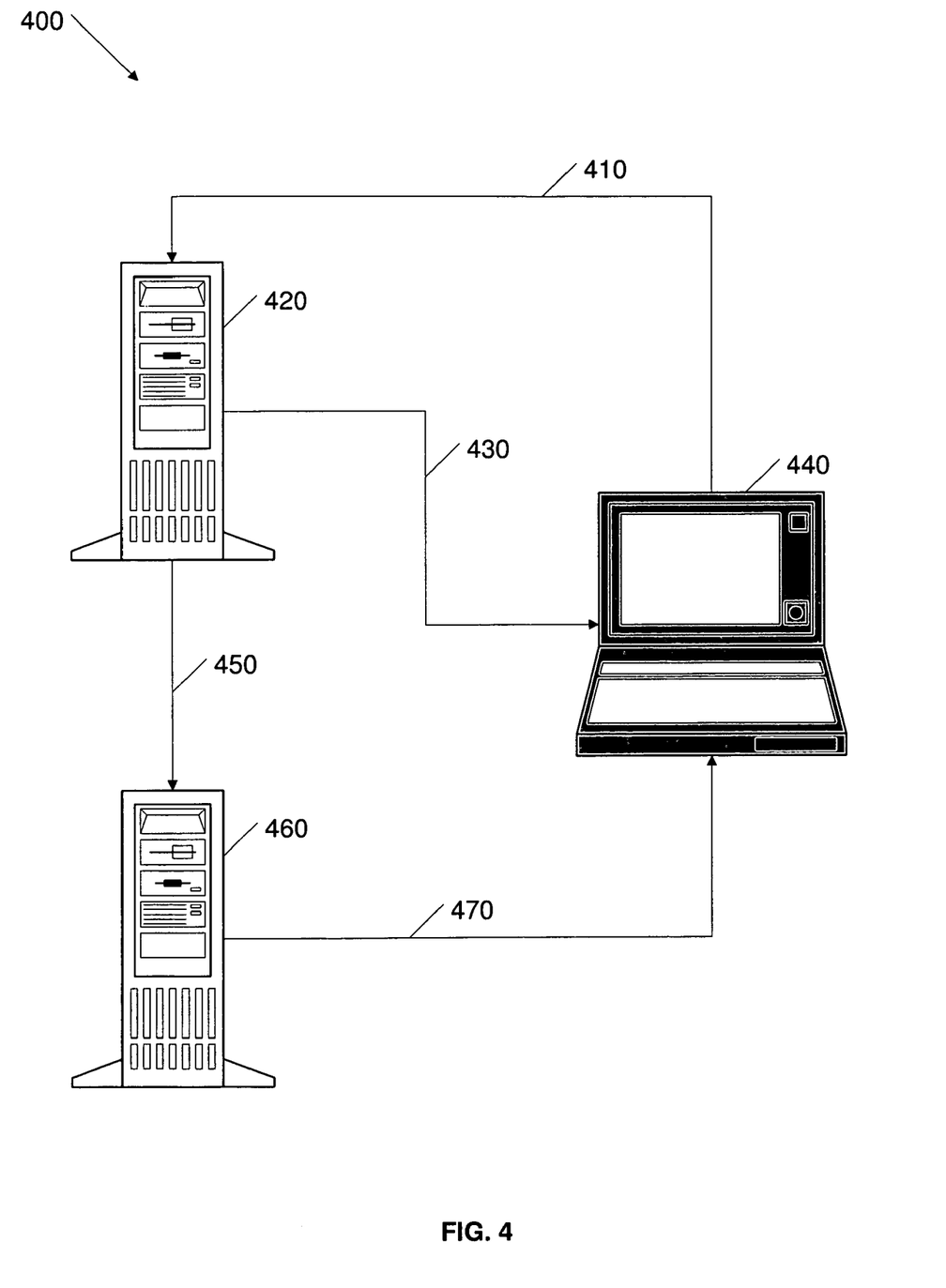
FIG. 4 illustrates how two server systems may configure a notebook computer.

Readjusting our focus, we move now to FIG. 4 which illustrates how a specific embodiment of a configuration system 400 may employ a first server 420 and a second server 460 to configure a computing apparatus. For the sake of illustration, let us assume that a consumer or customer has placed an order with a systems integrator for a notebook computer. Let us assume further that the customer has indicated that she wants the notebook computer to have a specific hardware configuration, have a certain operating system, and be delivered with a couple of specific applications.

The systems integrator may take the order from the customer and assemble notebook computer 440 so that it has the hardware configuration specified in the order. Upon assembling the requisite hardware, the systems integrator may initially apply power to or power-up notebook computer 440 to ensure that it has no hardware failures. After a successful initial power-up, the systems integrator may power-down and couple notebook computer 440 to the rest of configuration system 400 by using one or more communication modules, such as communication module 108 shown in FIG. 1A. In alternative embodiments, the systems integrator may also install one or more software components or software applications in notebook computer 440 after initial power-up but before connecting it to configuration system 400.

Notebook computer 440 may be configured with firmware program instructions which allow it to operate with limited functionality, even though notebook computer 440 may have no disk-based operating system installed. For example, notebook computer 440 may contain Intel® Active Management Technology (Intel® AMT). INTEL® AMT may store hardware and software information in non-volatile memory of notebook computer 440 and allow configuration system 400 to discover the installed hardware and software, or assets, of notebook computer 440. In other words having Intel® AMT or other firmware performing similar functions, configuration system 400 may not need to rely on software agents being installed on notebook computer 440 in order to configure it.

Upon applying power to notebook computer 440 and after notebook computer 440 is coupled with the rest of configuration system 400, server 420 may identify the type of computing apparatus that notebook computer 440 is and retrieve the hardware information, as well as the information for any installed software, via transfer 410. For example, server 420 may comprise an INTEL® AMT server which retrieves the serial number or hardware asset tag number from computer 440, as well as other preliminary configuration information, and matches the information with the order placed by the customer.

Based upon the initial configuration information retrieved from notebook computer 440 via transfer 410 and the corresponding order requirements, configuration system 400 may heuristically or "smartly" select multiple software components for notebook computer 440. For example, server 420 may match the hardware information retrieved from notebook computer 440 with types of software that the customer specified in the order and install versions of the software, via transfer 430, that are compatible with the hardware and software already installed on notebook computer 440.

Additionally, server 420 may transfer certain configuration information to second server 460, via transfer 450, so that server 460 may be used to install compatible software that the customer wants, or so that server 460 may configure certain elements of notebook computer 440, such as certain firmware programs or firmware settings. For example, server 460 may comprise a Pre-Boot Execution Environment (PXE) server. Once server 420 identifies notebook computer 440 and transfers its configuration via transfer 430, notebook computer 440 may act on the configuration information provided by server 420 to complete the software configuration delivered by PXE server 460 via transfer 470.

By using INTEL® AMT or another similar technology in servers such as server 420 and server 460 in this manner to remotely discover, track, and configure a computing apparatus under assembly, such as notebook computer 440, the systems integrator may utilize multiple different and unique hardware configurations within a single production process without introducing unnecessary human elements to determine the proper software to install. Additionally, systems integrators may be able to offer additional customizations to the customer, or end user, without augmenting their production costs. By using configuration systems to dynamically configure computing apparatuses in a production assembly line, a wide variety of computing apparatuses may be built and configured dynamically in real time without changing the production line feeds. Even further, this technique of dynamic configuration may allow systems integrators and other manufacturers to configure more complex systems quickly without burdening their assembly staff with new manual processes that introduce subtle configuration errors that are easily overlooked by automated test tools.

Figure 5:
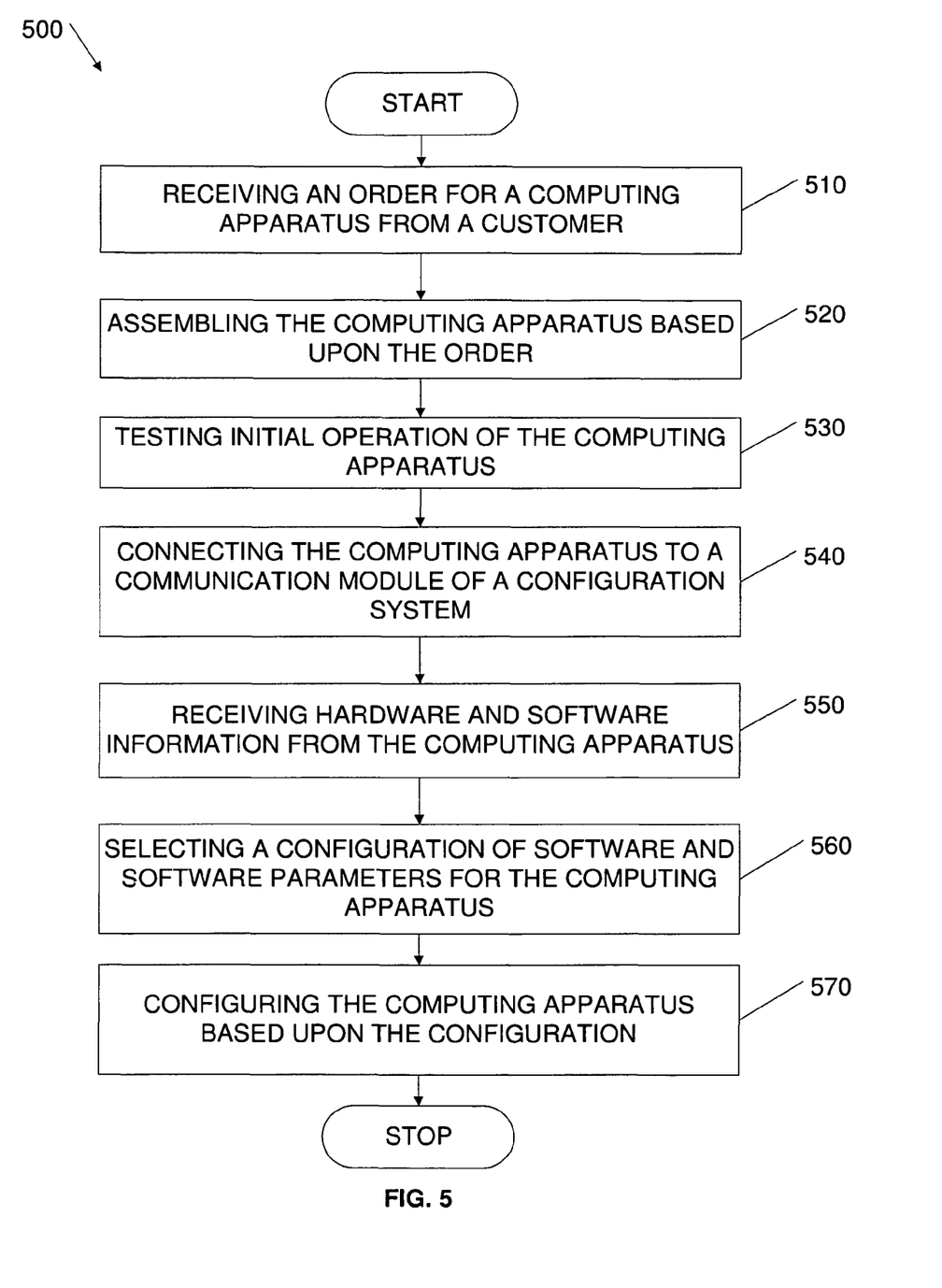
FIG. 5 illustrates a method for dynamic configuration of a computing apparatus.

FIG. 5 depicts a flowchart 500 illustrating an embodiment of a method to dynamically configure a computing apparatus. Flowchart 500 begins with receiving an order for a computing apparatus from a customer (element 510). For example, a customer may place an order for a dual socket, dual-core blade server apparatus from a systems integrator. When placing the order, the customer may specify that he wants seven blade server units installed in a ten slot rack having 8 GB of memory on each blade server unit. The customer may also specify that the computing apparatus should have a 73 gigabyte primary hard drive with a VMware® Enterprise operating system installed, as well as a custom PCI host bus adapter installed on one of the blade server units.

Upon receiving the order the systems integrator may assemble the seven blade server units in the rack along with the memory and other elements according to the order (element 520) and testing the initial operation of computing apparatus (element 530). Elaborating on the example above, the systems integrator may make sure that each of the individual blade server units, as well as the 73 GB hard drive and custom PCI host bus adapter, all operate properly. A method embodiment according to flowchart 500 may proceed by connecting the computing apparatus to a communication module of a configuration system (element 540). For example, the systems integrator may plug one end of an Ethernet cable into the back of the primary blade server unit and the other end into a network router.

Upon connecting the computing apparatus to the communication module of the configuration system (element 540), a method according to flowchart 500 may continue by receiving hardware and software information from the computing apparatus (element 550). For example, the configuration system may receive asset tag information, model numbers, and firmware version numbers for each of the hardware elements in the computing apparatus, such as each of the individual blade server units, the 73 GB hard drive, and the custom PCI host bus adapter.

After receiving the hardware and software information from the computing apparatus (element 550), an embodiment according to the method of flowchart 500 may continue by selecting a configuration of software and software parameters for the computing apparatus (element 560). Continuing with our example, the configuration system may use the hardware and software information pulled from the computing apparatus, as well as information contained in the order, to select a version of the VMware® Enterprise operating system that is compatible with the individual models and firmware version numbers for each of the individual blade server units, the 73 GB hard drive, and the custom PCI host bus adapter. Upon selecting a suitable version of the VMware® Enterprise operating system (element 560), a method of flowchart 500 may continue by configuring the computing apparatus (element 570). For example, the configuration system may install the VMWare® Enterprise operating system onto the 73 GB hard drive and save other configuration information to the computing apparatus.

Figure 6:
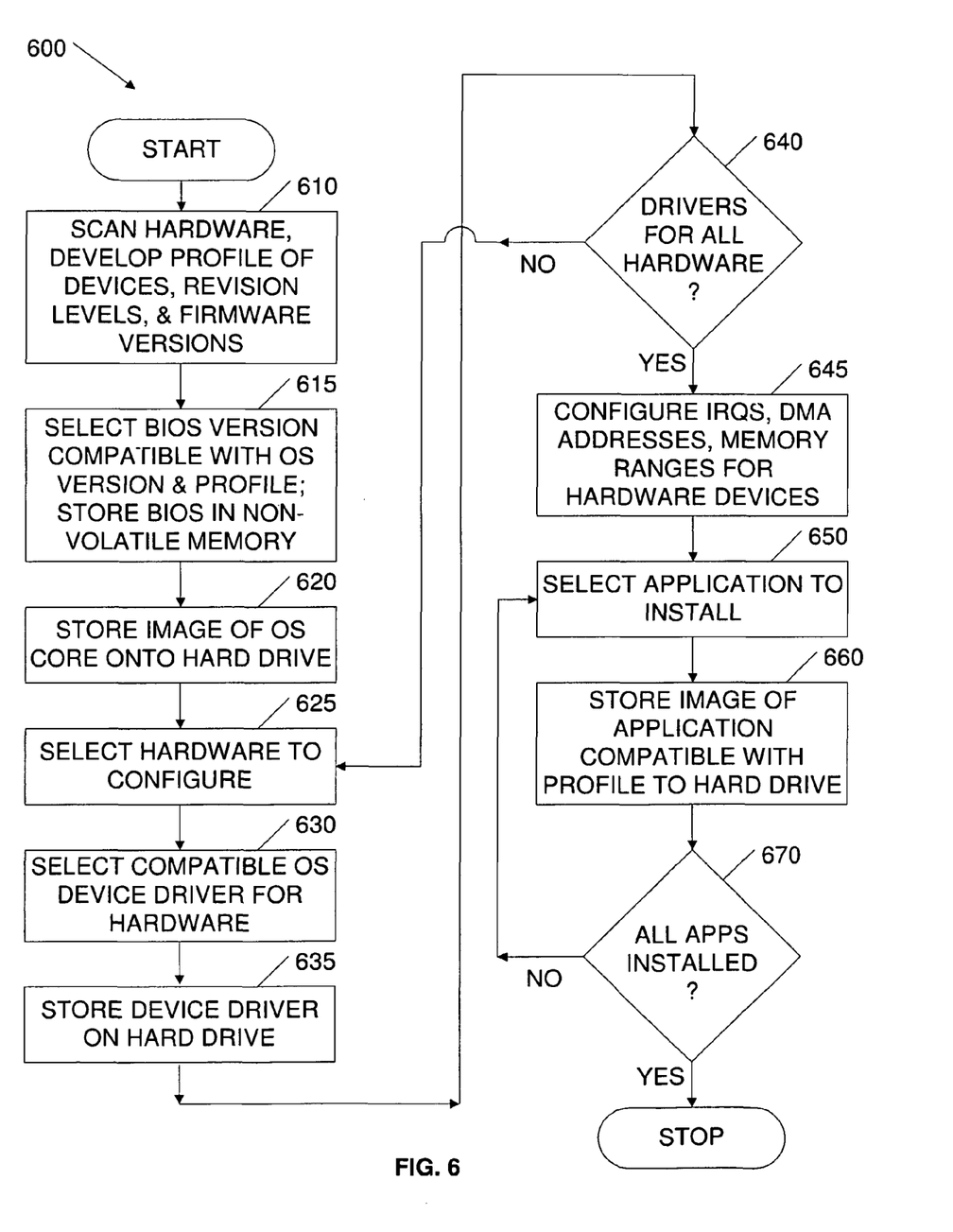
FIG. 6 depicts a flowchart illustrating a configuration system algorithm.

FIG. 6 depicts a flowchart 600 of an embodiment of a configuration system algorithm which a configuration system, such as configuration system 100 shown in FIG. 1A, may follow when configuring a computing apparatus. Flow chart 600 begins with scanning hardware of the computing apparatus to develop a profile of the installed and/or attached devices (element 610). As illustrated in FIG. 6, the profile may contain such information as hardware and/or software version numbers, as well as firmware versions, of the installed and/or attached devices. The configuration system may then select a BIOS version that is compatible with the operating system version and the profile information and store or transfer a copy of the BIOS program to a nonvolatile memory device of the computing apparatus (element 615).

After storing the copy of the BIOS program to the nonvolatile memory device of the computing apparatus (element 615), the algorithm may instruct the configuration system to store an image of an operating system core to a hard drive of the computing apparatus (element 620). For example, the configuration system may transfer a copy of a boot record and main operating system directory and subdirectories onto the hard drive of the computing apparatus, but the boot image and main directory may not contain all necessary device driver files. The algorithm may then instruct the configuration system to select a hardware device listed in the hardware profile information that needs to be configured (element 625), such as a peripheral device attached to the computing apparatus. The algorithm may then have the configuration system select a compatible operating system device driver for the selected hardware device (element 630) and store or copy the device driver onto the computing system hard drive (element 635). For example, the configuration system may copy a device driver and other configuration information for a sound card or graphic display adapter installed in the computing system.

Once the configuration system has installed a compatible operating system device driver for the selected hardware device, the algorithm may have the configuration system repeat the process for other hardware devices installed in or attached to the computing device (elements 640, 625, 630, 635). The algorithm may then instruct the configuration system to configure or assign Interrupt Request (IRQ) channels, Direct Memory Access (DMA) addresses, and dedicated memory ranges for each of the hardware devices (element 645).

Upon configuring the IRQ channels, DMA addresses, and dedicated memory ranges for each of the hardware devices (element 645), the algorithm may then have the configuration system select an application (element 650) that is compatible with the software already installed on the computing device, and compatible with the installed and/or attached hardware devices as well, and install the selected application to the computing apparatus (element 660). For example, the configuration system may need to install a database application that is compatible with a web browser program already installed on the computing apparatus. The algorithm may have the computing apparatus install other applications in an iterative process, until all applications and other configuration information needing to be installed on the computing apparatus are installed (elements 670, 650, 660).

Another embodiment of the invention is implemented as a program product for use with a configuration system to perform processes, such as the processes described in conjunction with configuration system 100 as illustrated in FIG. 1A. The program(s) of the program product defines functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such data and/or signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods and systems to dynamically configure computing apparatuses. It is understood that the form of the invention shown and described in the detailed description and the drawings are to be taken merely as examples. It is intended that the following claims be interpreted broadly to embrace all the variations of the embodiments disclosed.

Although the present invention and some of its aspects have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
  a preconfiguration receiver to receive apparatus information of a computing apparatus, wherein the apparatus information comprises information of hardware configuration;
  a configuration determiner to select a configuration element based upon an association of compatibility between the apparatus information and the configuration element; and
  a configuration transmitter to configure the computing apparatus based upon the selected configuration element, prior to the deployment of the computing apparatus to a consumer.

2. The apparatus of claim 1, wherein the apparatus information comprises at least two of a serial number, a hardware version number, a model number, a firmware version number, or a software program version number.

3. The apparatus of claim 1, wherein the configuration determiner is arranged to select the configuration element based on order information, from the consumer, in an order database.

4. The apparatus of claim 1, wherein the configuration determiner comprises a compatibility comparator arranged to determine the association of compatibility by comparing the information of the hardware configuration with different versions of the configuration element, wherein further at least one of the versions is incompatible with the hardware configuration.

5. The apparatus of claim 1, wherein the configuration element comprises one of a firmware setting, a firmware algorithm, a device driver, an application, or an operating system.

6. The apparatus of claim 1, wherein the computing apparatus comprises one of a desktop computer, a notebook computer, a server, a portable computing device, a portable music player, or a cellular telephone.

7. A method of configuring a computing apparatus, the method comprising:
receiving, by a configuration system, apparatus information of the computing apparatus, wherein the apparatus information comprises information of hardware configuration;
selecting, by the configuration system, a configuration element based upon an association of compatibility between the apparatus information and the configuration element; and
configuring the computing apparatus, via the configuration system, with the configuration element, prior to deployment of the computing apparatus to a consumer.

8. The method of claim 7, further comprising assembling the computing apparatus.

9. The method of claim 8, further comprising applying power to the computing apparatus to ensure the computing apparatus operates.

10. The method of claim 8, wherein assembling the computing apparatus comprises coupling a hardware device to one of a desktop computer, a laptop computer, a workstation, a server, or a portable computing device.

11. The method of claim 7, wherein selecting a configuration element comprises choosing, based on the association of compatibility, a version of a software program to be operated by the computing apparatus.

12. The method of claim 7, wherein configuring the computing apparatus comprises storing a firmware setting in the computing apparatus.

13. A tangible machine-accessible medium containing instructions, which when executed by a configuration system, cause the configuration system to perform operations, the operations comprising:
receiving apparatus information from a computing apparatus, wherein the apparatus information comprises information of hardware configuration of the computing apparatus, wherein further the computing apparatus comprises firmware instructions that enable the computing apparatus to communicate, with limited functionality, with the receiving apparatus;
selecting a configuration element based upon an association of compatibility between the apparatus information and the configuration element; and
configuring the computing apparatus for a consumer with the configuration element prior to deployment of the computing apparatus to the consumer.

14. The tangible machine-accessible medium of claim 13, further comprising accessing a storage device that contains at least two versions of the configuration element, wherein one of the at least two versions is incompatible with the hardware configuration of the computing apparatus.

15. The tangible machine-accessible medium of claim 13, wherein receiving the apparatus information comprises receiving at least one of a serial number, a hardware version number, an asset tag number, a model number, a firmware version number, or a software program version number.

16. The tangible machine-accessible medium of claim 13, wherein configuring the computing apparatus with the configuration element comprises storing a one of a firmware setting, a firmware algorithm, a device driver, an application, or an operating system.

17. A system to configure a computing apparatus, the system comprising:
a communication module to receive information of hardware configuration of the computing apparatus, wherein the hardware configuration is selected for the computing apparatus based on a consumer order;
a storage device containing a plurality of versions of a software application, wherein at least one version of the plurality is incompatible with the hardware configuration; and
a configuration determiner coupled to the communication module and the storage device, wherein the configuration determiner is configured to detect the incompatibility of the at least one version by comparing the information of hardware configuration with information of software compatibility of the plurality, and install another version of the plurality which is compatible with the hardware configuration, wherein further the configuration determiner comprises DRAM.

18. The system of claim 17, wherein the communication module comprises an Ethernet device.

19. The system of claim 17, wherein the communication module comprises a wireless communication device.

20. The system of claim 17, wherein the configuration determiner is arranged to identify the computing apparatus based upon an asset tag number.

21. The system of claim 20, wherein the configuration determiner is arranged to select at least one version of the plurality based upon the consumer order associated with the asset tag number of the computing apparatus.

22. The system of claim 17, wherein the configuration determiner comprises an INTEL® AMT server, wherein further the INTEL® AMT server is configured to store hardware and software information in non-volatile memory of the computing apparatus.

23. The system of claim 22, wherein the configuration determiner comprises a PXE server, wherein further the INTEL® AMT server is configured to communicate with the computing apparatus without using an operating system of the computing apparatus.

24. The system of claim 17, wherein the configuration determiner is configured to detect a second incompatibility of at least one version of a second software application by analyzing the information of hardware configuration, and install another version of the second software application which is compatible with the hardware configuration.

25. The system of claim 24, wherein the configuration determiner is configured to heuristically select the at least one version of the software application and the at least one version of the second software application.

* * * * *